(12) United States Patent
Schwarzbich

(10) Patent No.: US 6,178,838 B1
(45) Date of Patent: Jan. 30, 2001

(54) ADJUSTING MECHANISM ESPECIALLY FOR AN AUTOMOBILE SEAT

(76) Inventor: Jörg Schwarzbich, Wertheratr. 15, D-33615, Bielefeld (DE)

( * ) Notice: Under 35 U.S.C. 154(b), the term of this patent shall be extended for 0 days.

(21) Appl. No.: 09/318,821

(22) Filed: May 26, 1999

(30) Foreign Application Priority Data

May 26, 1998 (DE) .......................................... 298 09 418 U

(51) Int. Cl.$^7$ .................................................. F16H 27/02
(52) U.S. Cl. ............................................. 74/143; 192/43.1
(58) Field of Search ............................... 74/143; 192/43.1

(56) References Cited

U.S. PATENT DOCUMENTS

| | | |
|---|---|---|
| 5,248,017 | 9/1993 | Schwarzbich . |
| 5,794,479 | 8/1998 | Schwarzbich . |
| 5,865,285 | 2/1999 | Minkenberg et al. . |

FOREIGN PATENT DOCUMENTS 298 02 055  2/1998  (DE) .

*Primary Examiner*—Lenard A. Footland
(74) *Attorney, Agent, or Firm*—Burns, Doane, Swecker & Mathis, LLP

(57) ABSTRACT

An adjusting mechanism, in particular for seat adjusters in automotive vehicles, includes a drive member having a toothing and being movable in either of two mutually opposite directions. An actuating member is provided with two claws movably mounted on the actuating member such that, when the actuating member is moved out of a neutral position into one of two directions along the toothing of the drive member, one of the claws meshes with the toothing and the other claw is lifted away from the toothing by a guide contour. A switching member is movable along the toothing and is arranged to be entrained by the movement of the actuating member and to cancel the meshing engagement between the one claw and the toothing when the actuating member returns towards the neutral position.

7 Claims, 6 Drawing Sheets

ADJUSTING MECHANISM ESPECIALLY FOR AN AUTOMOBILE SEAT

BACKGROUND OF THE INVENTION

The invention relates to an adjusting mechanism, in particular a seat adjusting mechanism for automotive vehicles, comprising a drive member having a toothing and being movable in each of two mutually opposite directions, an actuating member having a neutral position, a guide contour, and two claws movably mounted on said actuating member such that, when the actuating member is moved out of said neutral position in one of said two directions along the toothing of the drive member, one of the two claws meshes with the toothing and the other one is lifted away from the toothing by said guide contour.

An adjusting mechanism of this type is disclosed in Fischer et al. U.S. Pat. No. 5,865,285, wherein the drive member is a gear which is coupled to a seat part to be adjusted through a freewheel brake. When a lever serving as an actuating member is pivoted in any direction out of the neutral position, the one of the claws which then forms the leading claw meshes with the toothing of the gear, so that the gear is rotated and the force is transmitted to the seat part to be adjusted via the freewheel brake. The freewheel brake holds the gear in the position it has reached, when the lever is returned to the neutral position. Thus, the seat part can be adjusted in any desired direction in a step-wise manner by repeatedly rocking the lever. During the return stroke of the lever, the latter is disengaged from the gear because the claw which is then the leading claw is lifted away from the toothing by the guide contour. The claw which at first has been in mesh with the gear could slip over the toothing during the return movement. Then, it would however produce a noise like a ratchet, and this may be disagreeable for the user. For this reason, the known adjusting mechanism provides a spring system which biases the trailing claw away from the toothing during the return stroke of the lever.

However, this construction is relatively cumbersome and further has the drawback that the coupling between the actuating lever and the gear is cancelled as soon as the user interrupts the adjusting movement. Then, the user must at first return the lever to the neutral position in order to re-establish the coupling.

It is an object of the invention to provide an adjusting mechanism of the type indicated above which has simple construction, is easy to operate and the actuating member of which can be returned to the neutral position without producing substantial noise.

SUMMARY OF THE INVENTION

According to the invention, this object is achieved by providing a switching member movable along said toothing and being arranged to be entrained by the movement of said actuating member and to cancel the meshing engagement between said one claw and the toothing when the actuating member returns towards the neutral position.

Thus, during the return stroke of the actuating member, one of the claws is held disengaged from the toothing by the switching member and the other claw is held disengaged from the toothing by the guide contour, so that both claws can move relative to the toothing with low resistance and low noise production. Since the switching member follows the movement of the claws when the actuating member is moved out of the neutral position, it can cancel the engagement between the claw and the toothing irrespective of the position of said claw, as soon as the direction of movement of the actuating member is reversed. When the direction of movement is reversed again, the switching member admits again the engagement between the claw and the toothing, and it is not required that the actuating member is at first returned to the neutral position.

Preferably, the switching member has ramp surfaces which co-operate with the claws or, more precisely, with cams provided on these claws, in a similar way as the stationary guide contour. The path of movement of the switching member is preferably determined by stationary guide means which extend in parallel with the toothing of the drive member and may be provided on the same component member as the stationary guide contour. Advantageously, the switching member is biased to be in frictional engagement with the guide means. Thanks to this frictional engagement, a relative movement between the claws and the switching member can be caused when the direction of movement of the actuating member is reversed, so that the claw or the cam thereof slides onto the ramp surface of the switching member and is thereby lifted off from the toothing. If the claws are elastically biased towards the toothing, as is common practice in the art of such actuating mechanisms, then this bias can at the same time be used for clampingly holding the switching member against the guide means.

The drive member may be an externally toothed gear. It may however also be formed by an internally toothed ring rear or by a straight tooth rack. In case of an internally or externally toothed gear, the switching member may optionally be mounted to be pivotable about the axis of this gear.

BRIEF DESCRIPTION OF THE INVENTION

The objects and advantages of the invention will become apparent from the following detailed description of preferred embodiments thereof in connection with the accompanying drawing in which like numerals designate like elements, and in which.

DETAILED DESCRIPTION OF PREFERRED EMBODIMENTS OF THE INVENTION

Figure 1:
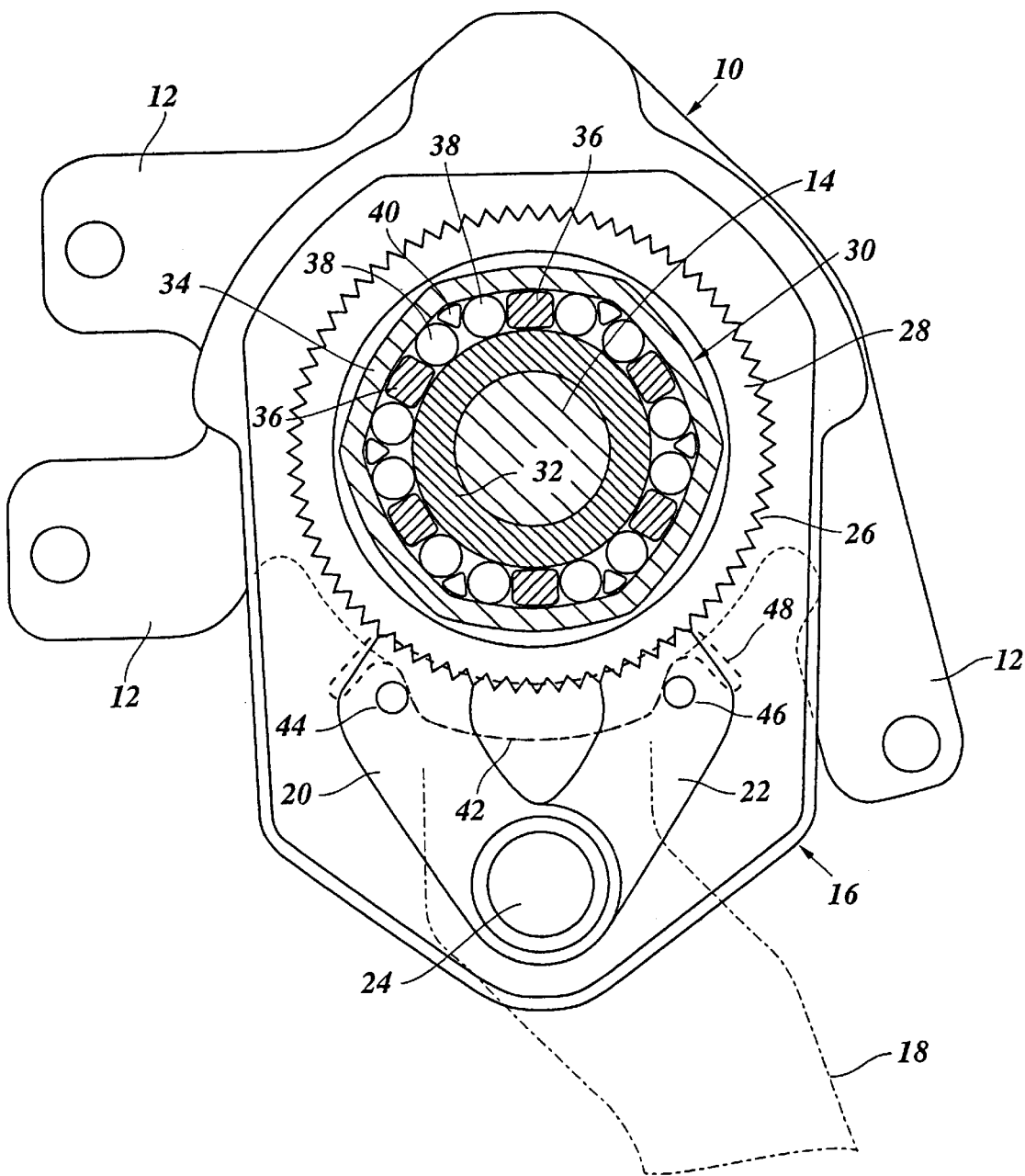
FIG. 1 is a partially sectioned view of an adjusting mechanism.

The actuating mechanism shown in 1 may for example be a seat height adjuster for automotive vehicles. A base plate 10 has fastening tabs 12 and is adapted to be rigidly connected to a stationary part of the vehicle body. The base plate 10 is traversed by a shaft 14 which causes the height adjustment of a seat frame of the vehicle seat by means of any suitable drive mechanism such as a rack and pinion mechanism (not shown). A housing 16 provided with an actuating member shaped as a lever 18 (indicated in dot-dashed lines in the drawing) is mounted on the base plate 10. The housing 16 and the lever 18 are pivotable relative to the base plate 10 about the central axis of the shaft 14. The lever 18 carries two claws 20, 22 which are pivotable relative to the lever 18 about a common pivot shaft 24 and can mesh with the toothing 26 of a gear 28 serving as a drive member. The toothed portions of the claws 20, 22 are elastically biased against the toothing 26 of the gear by means of springs (not shown).

The gear 28 is accommodated in the housing 16 and is drivingly connected to the shaft 14 through a freewheel brake 30. The construction and operation of the freewheel brake 30 are described in detail in Applicant's U.S. Pat. No. 5,248,017 entitled "Rotation Transmitting Mechanism" (the disclosure of which being incorporated herein by reference) and will therefore be described only briefly herein. An inner race 32 of the freewheel brake is rigidly secured to the base plate 10. A pot-shaped outer race 34 is rigidly connected to the shaft 14. The pot-shaped outer race has a bottom which cannot be seen in the drawing and is formed with recesses which extend in the circumferential direction and are each traversed by a prong 36 with a little play in the circumferential direction. The prongs 36 are rigidly connected to the gear 28, so that the outer race 34 and the shaft 14 are co-rotatably coupled to the gear 28, but are rotatable relative to the gear within the limited range of play. A pair of roll bodies 38 and a biasing member 40 intervening therebetween are arranged in each of the gaps between the prongs 36.

The outer race 34 has a slightly polygonal internal cross-sectional shape, so that the annular hollow space between the outer race and the inner race becomes narrower from each of the biasing members 40 towards the prongs 36. When the gear 28 is subject to a torque in any direction, each prong 36 pushes the roll body 38 disposed in front thereof towards the associated biasing member 40 and thus holds the roll body in a position in which it can roll along the inner race 32. The outer race 34 and the shaft 14 are therefore rotatable together with the prongs 36, so that the torque of the gear 28 is transmitted to the shaft 14. On the other hand, when a torque in any direction acts upon the shaft 14, the outer race 34 connected with the shaft has a tendency to be rotated relative to the inner race 32, and the roll bodies 38 are jammed in the hollow space between the inner and outer races. In this way, the shaft 14 is arrested by a self-locking effect.

In a region between the claws 20, 22 the base plate 10 forms a guide contour 42 which co-operates with cams 44, 46 provided on the claws 20, 22. In addition, a switching member 48 is shown in dashed lines in FIG. 1. The external shape of this switching member, the function of which will be described later, is partly congruent with the guide contour 42.

In FIG. 1, the lever 28 and the housing 16 are shown in a neutral position. In the upper part as seen in FIG. 1, the housing 16 accommodates a return spring (not shown), which serves to return the housing and the lever into this neutral position relative to the base plate 10. Possible constructions of the return spring are described in Applicant's U.S. Pat. No. 5,794,479 and in the German Utility Model DE 298 02 055 U, the disclosure of which are incorporated herein by reference. These two documents also describe the construction and function of the freewheel brake 30 within a seat adjuster. The last-mentioned document also shows a locking mechanism with which the lever, when it is in the neutral position, can additionally be locked to the housing.

Such a mechanism can also be provided in the embodiments disclosed herein.

If the lever 18 is manually rotated out of the neutral position shown in FIG. 1, counterclockwise for example, then the claw 20 meshes with the toothing 26, so that the torque of the lever is transmitted to the gear 28 and further to the shaft 14. Meanwhile, the cam 46 of the other claw 22 slides onto the guide contour 42 and causes a pivotal movement of the claw 22 away from the toothing 26. When, thereafter, the lever 28 is returned to the neutral position, the gear 28 is held in the once-reached position by the freewheel brake 30, and only the lever 18 and the housing 16 return into the neutral position. When the lever 18 is rotated out of the neutral position in the opposite direction, the functions of the claws 20 and 22 are interchanged.

Figure 2:
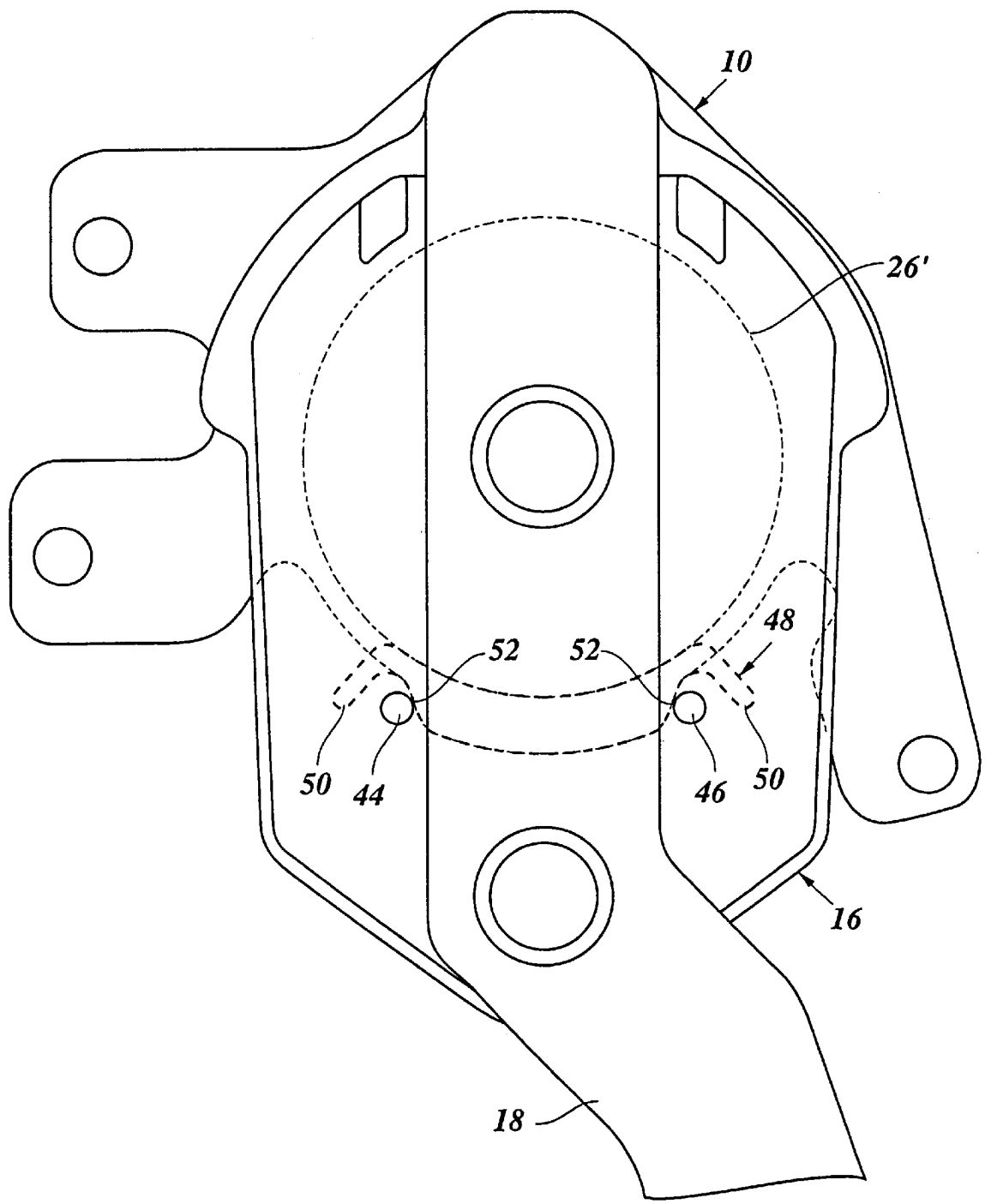
FIGS. 2 to 5 are simplified representations of the adjusting mechanism in differently positions.

In FIG. 2, the actuating mechanism is depicted more schematically. Of the claws 20, 22, only the cams 44, 46 have been shown, so that the contour of the switching member 48 can be seen more clearly. The switching member is supported by a circular guide 26' the contour of which corresponds substantially to the envelope of the toothing 26 of the gear 28 in FIG. 1. The guide 26' may be formed by the toothing 26 itself or, alternatively, by a non-toothed collar of the gear 28. As an alternative, the guide may also be formed at the baseplate 10. Since the claws 20, 22 are elastically biased against the gear 28, the switching member 48 is clampingly held in position at the guide 26' by the cams 44 and 46, so that no extra fastening means are required for the switching member.

The switching member 48 is movable along the guide 26', i.e. in parallel with the toothing 26, with a certain amount of friction, and stops 50 for the cams 44 and 46 are symmetrically provided at both ends of the switching member. The central portion of the switching member is congruent to the guide contour 42 formed at the baseplate 10 and forms symmetric ramp surfaces 52 which are engaged by the cams 44, 46 when the lever 18 and the housing 16 are in the neutral position.

Figure 3:
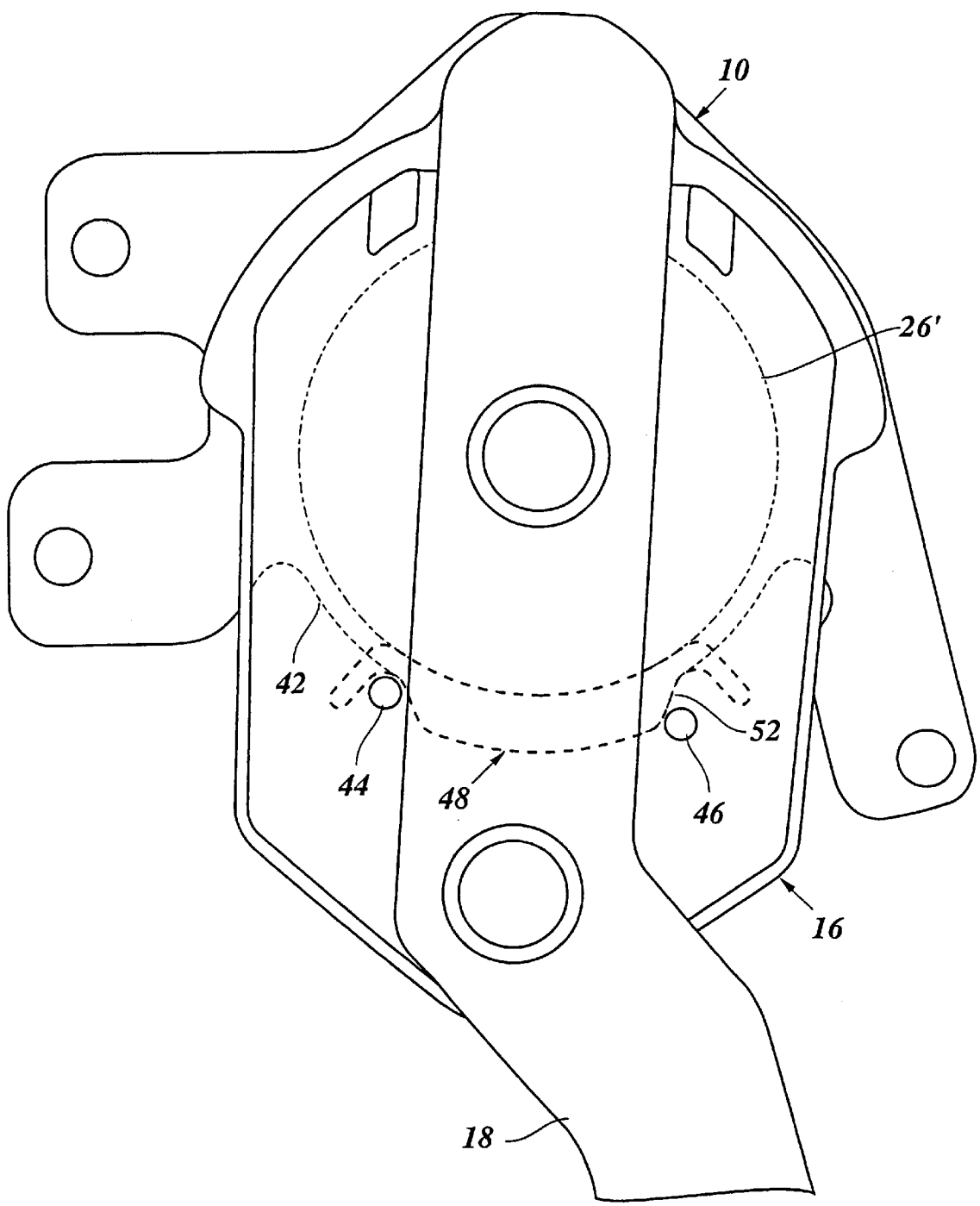

FIG. 3 illustrates a state in which the lever 18 and the housing 16 have been slightly pivoted out of the neutral position. The cams 44, 46 have shifted slightly relative to the guide contour 42 of the baseplate 10, in accordance with the movement of the lever 18. Due to the elastic bias, the cam 44 has approached the gear, so that the claw associated therewith meshes with the toothing of the gear. On the other hand, the cam 46 has been pushed away from the toothing by the ramp surface 52 of the switching member and/or the corresponding ramp surface of the guide contour 42.

Figure 4:
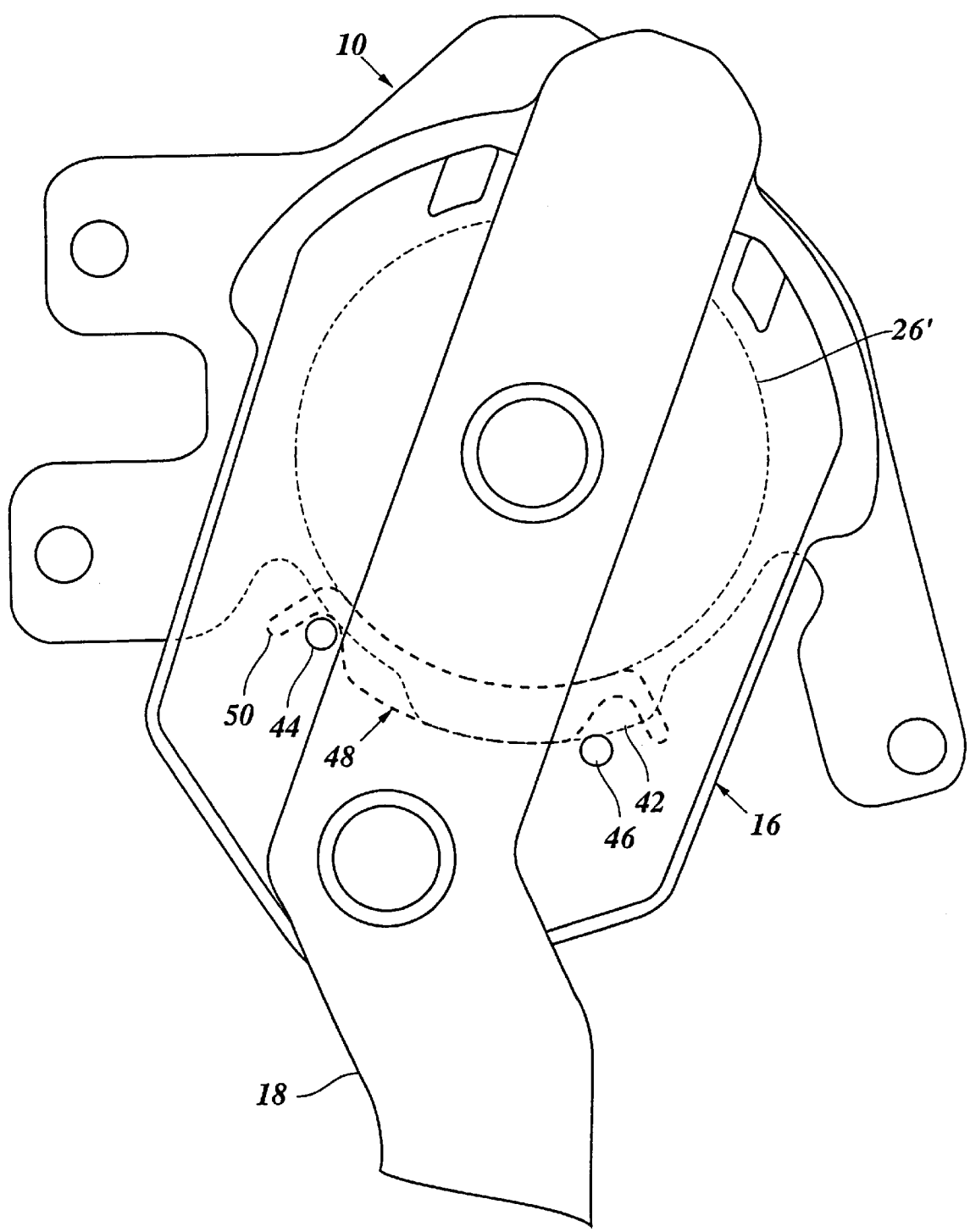

When the lever 18 is pivoted further in clockwise direction, the gear 28 is driven by the claw 20, and the height of the seat is adjusted accordingly. In this state, the cam 44 engages the stop 50 of the switching member 48, so that the switching member is slidingly displaced along the guide 26'. The cam 46 of the other claw is held in a position spaced away from the toothing either by the switching member 48 or by the guide contour 42, as is shown in FIG. 4. Preferably, the contour of the switching member is designed such that the cam 46 engages the switching member in this position and biases it against the guide 26'.

Figure 5:
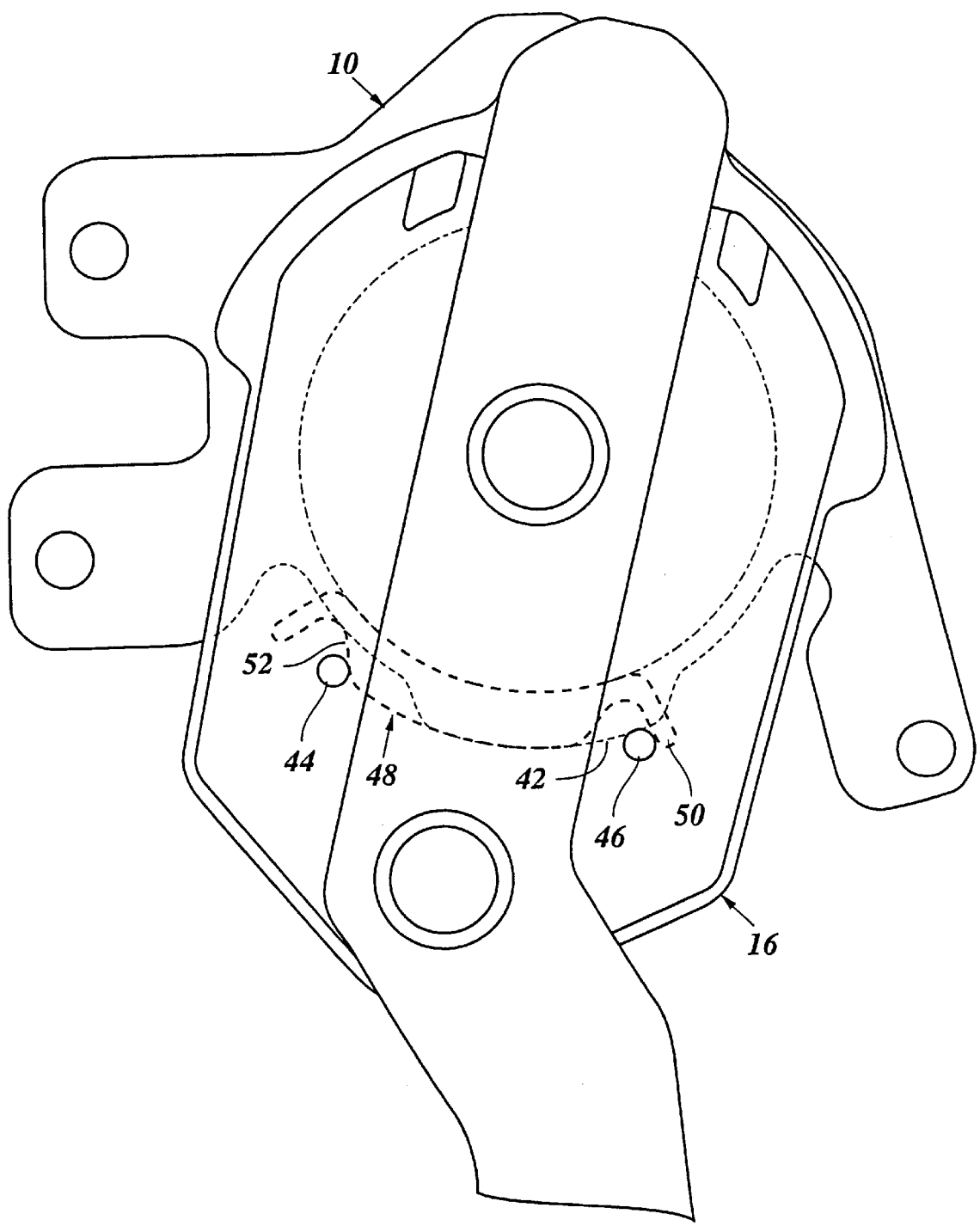

When, then, the lever 18 is moved in the opposite direction, the switching member 48 is at first held in its position by friction. The cam 46 disengages from the ramp surface 52 of the switching member, but is still supported by the guide contour 42 and finally abuts against the stop 50 of the switching member. Meanwhile, the cam 44 slides upon the other ramp surface of the switching member and is thereby pushed away from the toothing of the gear 28, as is shown in FIG. 5. Thus, during the subsequent return movement of the lever 18 into the neutral position, none of the claws 20, 22 meshes with the toothing 26 of the gear 28, so that the return movement can be performed without causing any substantial noise. As soon as the lever 18 has reached again the neutral position, the guide contour 42 admits that the cam 46 approaches again the toothing 26, and the cam 44 abuts the opposite flank of the guide contour 42 so that the state shown in FIG. 2 is reached again.

If, however, starting from the position shown in FIG. 5, the lever 18 is again rotated clockwise, then the cam 44 slides along the ramp surface 52, and the claw 20 comes again into meshing engagement with the toothing, so that the gear 28 can be rotated further in clockwise direction.

When the lever 18 is rotated counterclockwise out of the neutral position, the sequence of movements is analogous to what has been described above.

Figure 6:
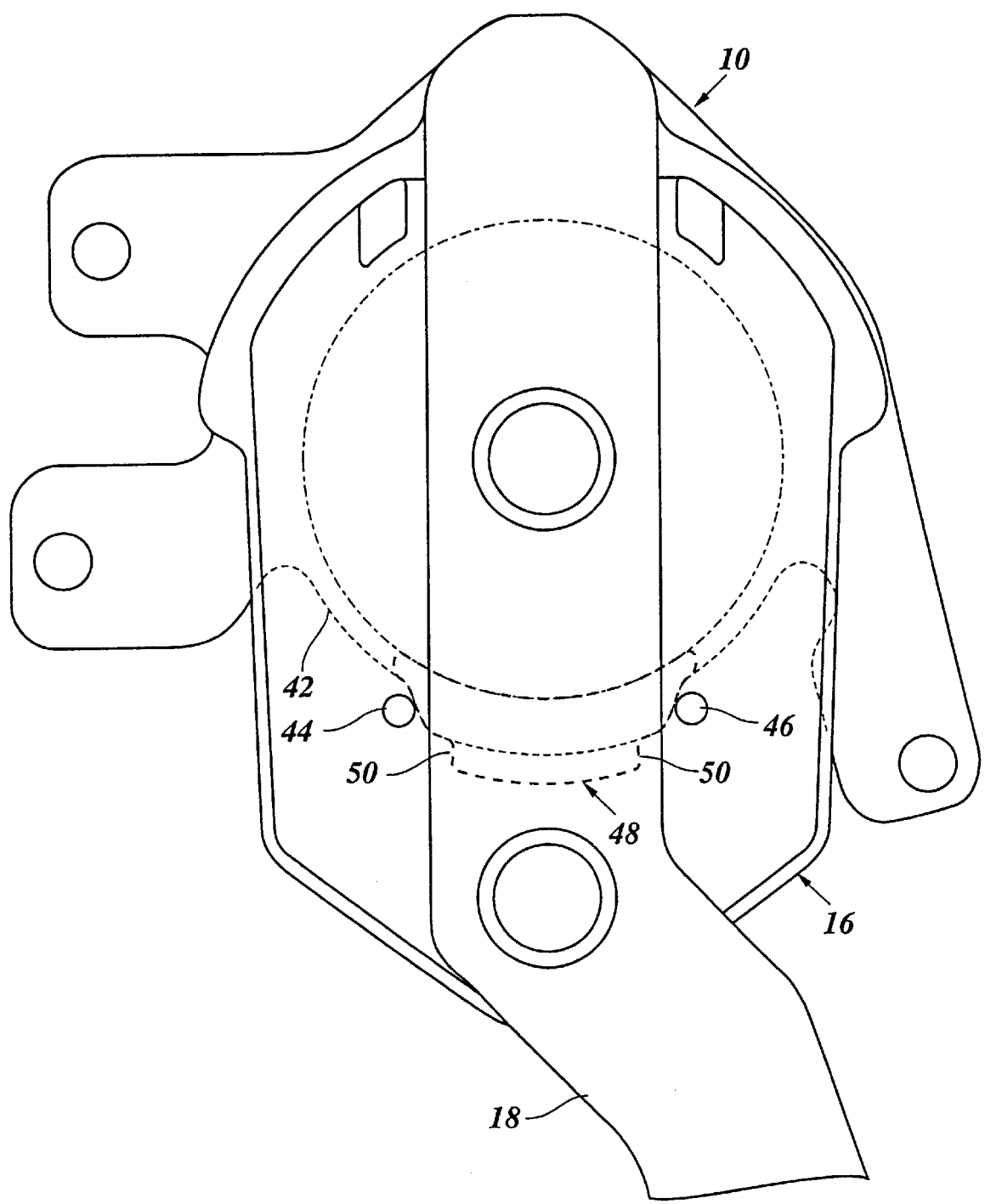
FIG. 6 shows a modified embodiment example of the actuating mechanism.

FIG. 6 illustrates a modified embodiment example in which the switching member 48 has a slightly different contour. Here, the stops 50 are formed between the cams 44 and 46. While, in the embodiment according to FIGS. 1 to 5, the switching member is dragged by the leading one of the cams, it is pushed by the trailing one of the cams in the embodiment shown in FIG. 6. In other respects, the operation corresponds to that of the first embodiment example.

In both embodiments, a desirable frictional engagement between the switching member 48 and the base plate 10 can be achieved alternatively or additionally by "sandwiching" the plate-like switching member between the base plate and another member or by biasing the switching member against the base plate by means of a spring.

What is claimed is:

1. Adjusting mechanism comprising:
    a drive member having a toothing and being movable in each of two mutually opposite directions,
    an actuating member having a neutral position,
    a guide contour,
    two claws movably mounted on said actuating member such that, when the actuating member is moved out of said neutral position into one of said two directions along the toothing of the drive member, one of the two claws meshes with the toothing and the other one is lifted away from the toothing by said guide contour, and
    a switching member movable along said toothing and being arranged to be entrained by the movement of said actuating member and to cancel the meshing engagement between said one claw and the toothing when the actuating member returns towards the neutral position.

2. Adjusting mechanism according to claim 1, wherein the switching member has ramp surfaces arranged symmetrically and co-operating with said claws or with cams provided on said claws, and the switching member is held in frictional engagement with the drive member and/or a stationary member.

3. Adjusting mechanism according to claim 2, wherein the switching member is supported by a guide which extends in parallel with said toothing.

4. Adjusting mechanism according to claim 3, wherein said claws are elastically biased against the toothing and are arranged to elastically hold the switching member in engagement with said guide.

5. Adjusting mechanism according to claim 1, wherein said switching member has a pair of stops which are arranged symmetrically, such that, when said actuating member is moved in one of said two directions, one of said stops is engaged by one of said claws and the other claw is held away from the toothing by the switching member.

6. Adjusting mechanism according to claim 1, comprising a shaft which forms an output member of said actuating mechanism, wherein said drive member is a gear that is drivingly connected to said shaft through a freewheel clutch.

7. Adjusting mechanism according to claim 6, wherein said guide contour is provided on a base plate and said actuating member is connected to a housing that is movable relative to said baseplate and accommodates said claws and said switching member.

* * * * *